United States Patent [19]
Grove

[11] 3,969,924
[45] July 20, 1976

[54] FLUID FLOW CONTROL APPARATUS AND METHOD

[75] Inventor: Marvin H. Grove, Houston, Tex.

[73] Assignee: M & J Valve Company, Houston, Tex.

[22] Filed: May 2, 1975

[21] Appl. No.: 573,904

[52] U.S. Cl. .................................. 73/46; 137/557; 251/324
[51] Int. Cl.² .......................................... G01M 3/28
[58] Field of Search .................. 73/40, 46; 251/324, 251/333; 137/557

[56] References Cited
UNITED STATES PATENTS 3,827,285    8/1974    Grove ..................................... 73/46

FOREIGN PATENTS OR APPLICATIONS 2,033,058    1/1972    Germany ..................... 137/625.69

*Primary Examiner*—S. Clement Swisher
*Attorney, Agent, or Firm*—Flehr, Hohbach, Test, Albritton & Herbert

[57] ABSTRACT

Apparatus having cup-shaped sealing members of resilient material carried by a plunger with their rim portions faced toward each other. The rims are successively contracted when the plunger assembly is moved into an associated cylindrical sleeve, with exterior areas of the rims in sealing contact with the inner cylindrical surface of the sleeve. There is a closed space between the sealing members in which liquid is trapped under pressure as the plunger is moved into the sleeve.

9 Claims, 5 Drawing Figures

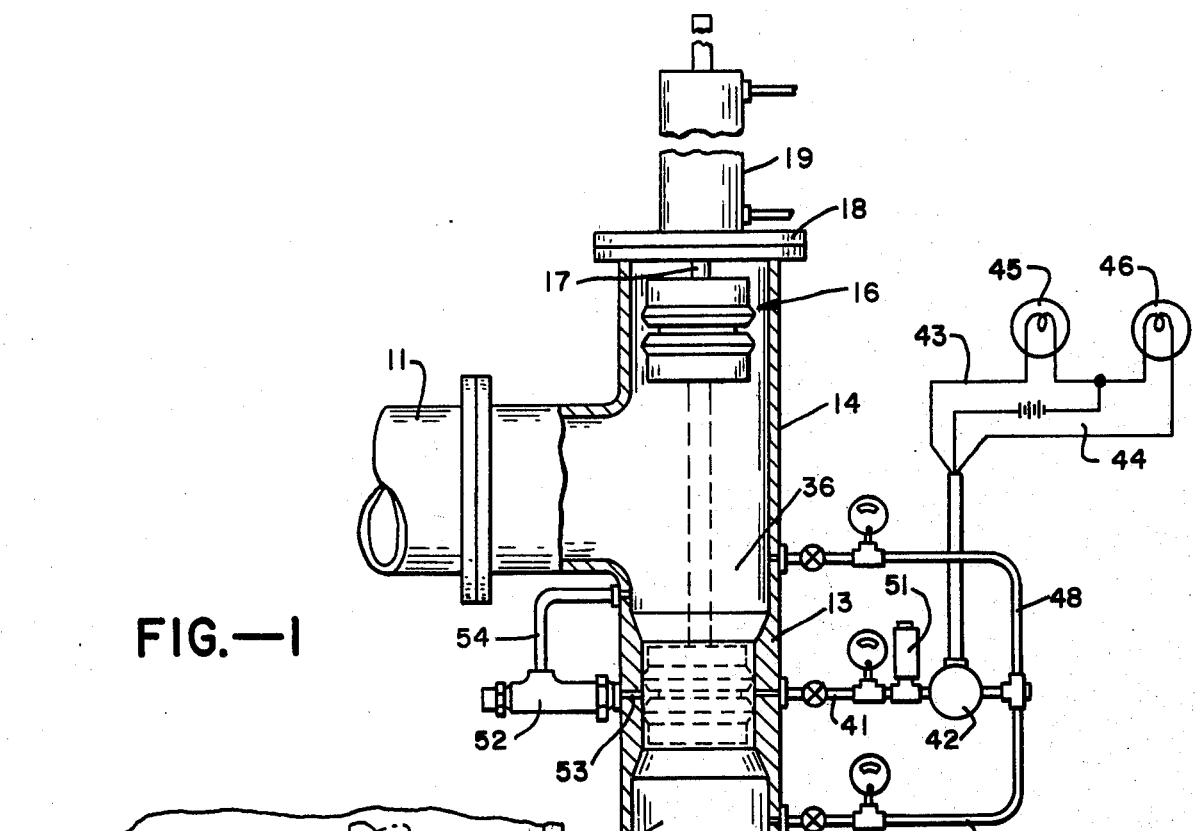
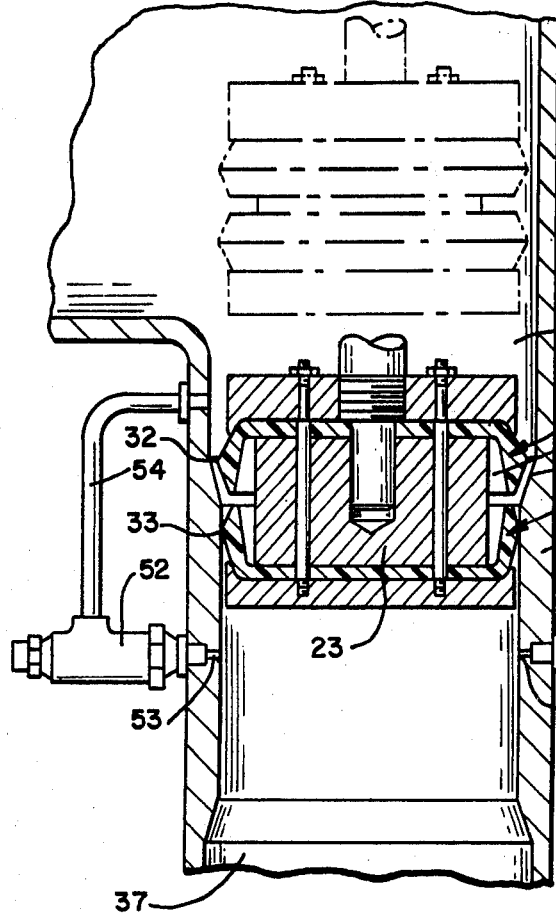
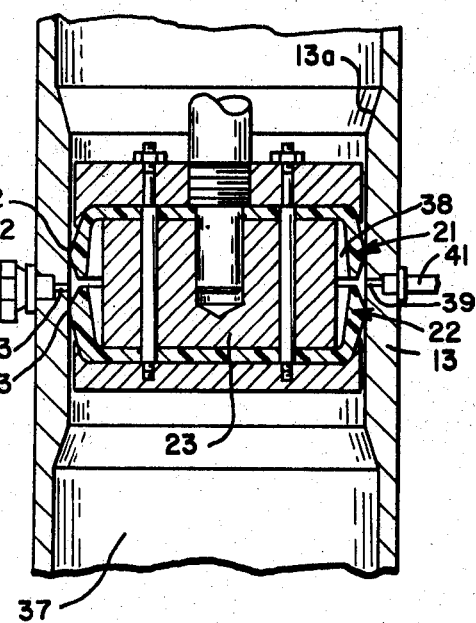
FIG.—1
FIG.—3
FIG.—4

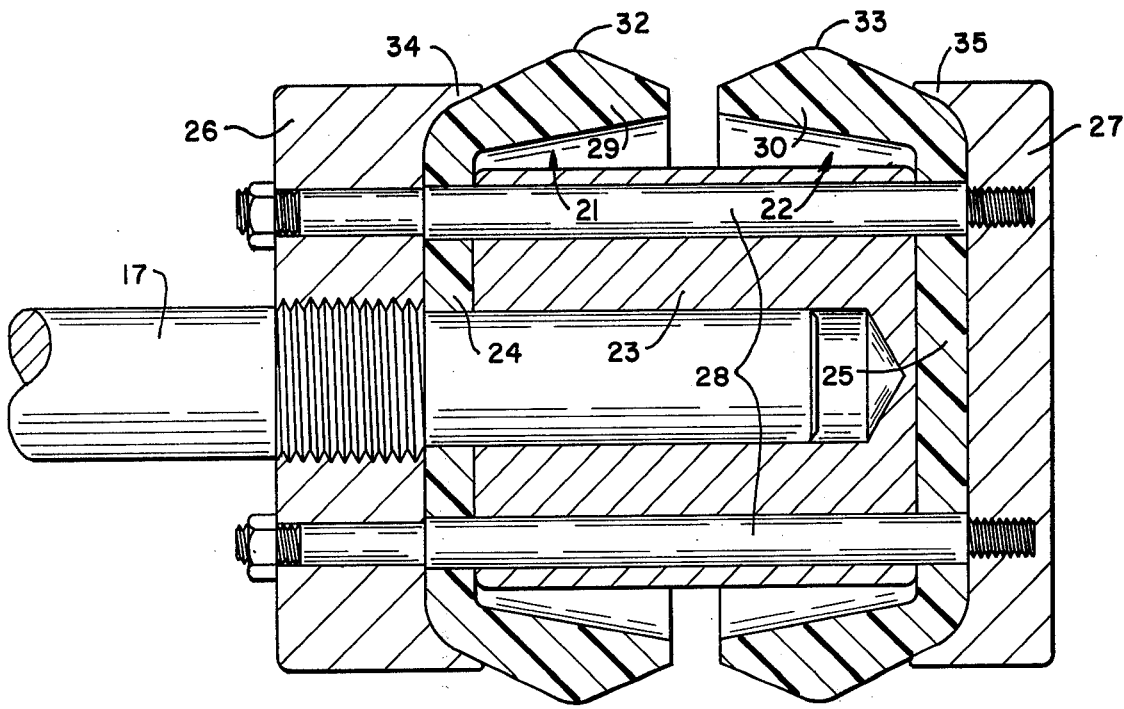
FIG.—2
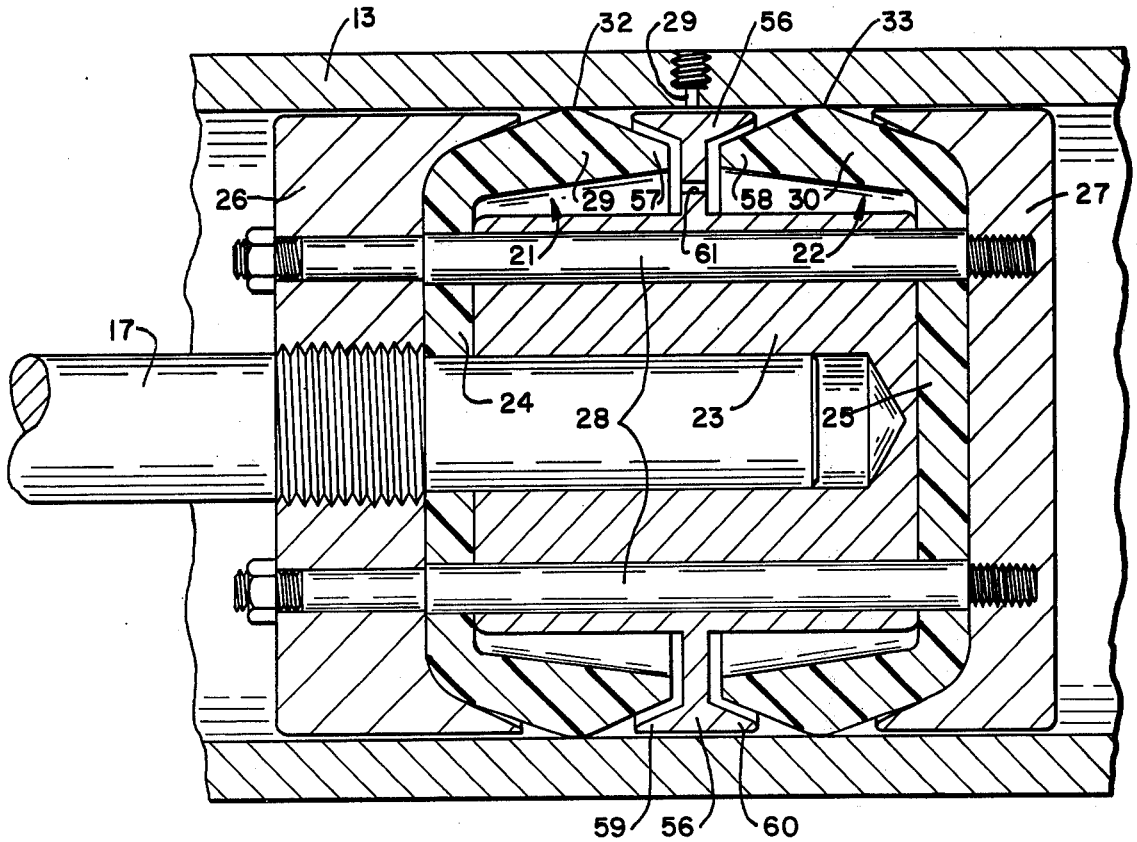
FIG.—5

FLUID FLOW CONTROL APPARATUS AND METHOD

BACKGROUND OF THE INVENTION

This invention relates generally to apparatus and method for controlling the flow of various fluids, such as water, petroleum liquids and the like. One type of sealing means now being used in various types of flow control apparatus, such as valves, flow diverters and meter provers employs a plunger having sealing cups made of resilient material. The plunger assembly is arranged to move into and out of a cylindrical sleeve to arrest or permit flow of liquid though the same. In U.S. Pat. No. 3,827,285 granted Aug. 6, 1974, apparatus of this type makes use of two cups which have their rims faced away from each other. When such an arrangement is used to control flow of fluid through the sleeve, contraction of the rims of the cups as the plunger assembly is moved into the sleeve causes a pressure drop to be induced in the closed space between the cups, and the maintenance of this self-induced pressure drop is used to detect any leakage. Such flow control apparatus is being used commercially in meter provers and flow diverters.

Proper sealing of the resilient cups in such apparatus is in part dependent upon the properties of the resilient material from which they are made. In the event there is a tendency for the cups to undergo dimensional changes, as for example, a shrinkage in diameter due to the effect of the liquids involved or changes in elasticity due to aging of the resilient material, the peripheral areas of the cup rims may be urged against the inner cylindrical surface of the sleeve with less force, thus occasioning the risk of leakage, particularly when the self-induced pressure drop is substantial, since it tends to reduce the contact pressure of the rims against the sleeve.

SUMMARY OF THE INVENTION AND OBJECTS

In general, the present invention relates to flow control apparatus and method of the type previously metenioned, namely having cup-shaped sealing members made of resilient material. It is an object of the invention to provide such apparatus constructed and operating in such a manner that when the plunger assembly is moved into a sleeve to arrest flow, fluid pressure forces are created which act upon the rims of the cups to increase the contact pressure between the rims and the sleeve.

Another object is to provide a flow control apparatus and method making use of sealing cups of resilient material, in which a substantial static pressure is induced in the closed space between the cups when the plunger carrying the cups is moved into the associated sleeve to establish a seal, the pressure being greater than that in the space from which the assembly is moved.

In general, the present invention consists of a sleeve having an inner cylindrical surface and a converging entrant portion at at least one end of the same. The sleeve is carried by or incorporated in a body which forms liquid enclosing spaces communicating with the ends of the sleeve. A plunger or barrier is carried within the body in such a manner that it can be moved out of or into the sleeve. The plunger carries cup-shaped sealing members of resilient material, the arrangement being such that the rims are faced toward each other. The sealing members when relaxed have a diameter greater than the internal diameter of the sleeve whereby they are successively contracted as the plunger moves into the sleeve. Peripheral areas of the rim portions establish sealing engagement with the inner cylindrical surface of the sleeve. The configuration of the parts is such that when the plunger is within the sleeve, there is enclosed space between the sealing members in which liquid is trapped. Successive contraction of the rims of the sealing cups as the plunger is moved into the sleeve causes the liquid in this space not only to be trapped but also to be placed under a pressure substantially greater than the static pressure of the liquid in the space from which the plunger is moved, whereby fluid pressure acts on the rims in a direction tending to urge them toward the inner surface of the cylinder. The maintenance of this self-induced pressure can also be used to detect any leakage present. In one embodiment, the rims of the sealing members are protected against excessive outward flexing, thereby protecting the rims under conditions of relatively high pressure differentials and flow rates.

Additional objects and features of the invention will appear from the following description in which the preferred embodiments have been set forth in detail in conjunction with the accompanying drawing.

BRIEF DESCRIPTION OF THE DRAWING

FIG. 1 is a side elevational view in section illustrating flow control apparatus incorporating the present invention.

FIG. 2 is a detail on an enlarged scale and in section illustrating one construction for the plunger assembly.

FIG. 3 is a detail in side elevation and in section, illustrating the plunger assembly being moved from a position out of the associated sleeve to a position partly within the sleeve.

FIG. 4 is a detail in side elevation and in section illustrating the plunger assembly disposed completely within the sleeve.

FIG. 5 is a detail in section and on an enlarged scale showing another embodiment of the plunger assembly in which means is provided to prevent excessive outward deflection of the rims of the sealing cups.

DESCRIPTION OF THE PREFERRED EMBODIMENTS

The apparatus shown in FIG. 1 consists of liquid flow pipes 11 and 12 which are interconnected by means including the sleeve 13. The part adjacent one end of the sleeve is in the form of a tee 14 which accommodates the plunger assembly 16. The plunger assembly is carried by the operating rod 17 which is concentric with the axis of the sleeve 13 and which extends though the closure plate 18 mounted on one end of the tee. The exterior end of the operating rod 17 is shown connected to a suitable power operator 19, such as a double-acting hydraulic cylinder-piston assembly, which when energized serves to move the plunger assembly between its operating positions, one being retracted from the sleevve as shown in FIG. 1, and other being projected within the sleeve as shown in dotted lines. A short pipe section 20 is shown connecting the other end of the sleeve with the pipe 12. It is to be understood that this construction is representative of a suitable body which incorporates the sleeve 13, and which has spaces at the ends of the sleeve which are connected to flow passages.

FIG. 1 is representative of relatively simple apparatus which is operated to permit flow between the piping 11 and 12, and to arrest such flow. The invention can be incorporated in more or elaborate apparatus using two or more plunger assemblies carried by the same operating rod, and adapted to establish seals with respect to two more sleeves. Such apparatus may have a body having more than two flow passages connected with associated piping, and depending upon the positioning of the plunger assemblies, may control the flow in a desired manner between the various passages and piping. Also it can be incorporated in meter provers of the type disclosed in copending U.S. application Ser. No. 434,088, filed Jan. 17, 1974.

FIG. 2 illustrates one construction of the plunger assemby. It consists of cup-shaped sealing members 21 and 22 made of suitable resilient material, such as a synthetic rubber or elastomer. A spacer 23 is interposed between the base portions 24 and 25 of the sealing members. The annular clamping member 26 has threaded engagement with the operating rod 17 and applies clamping force to the sealing member 21, and another annular clamping member 27 applies clamping force to the base portion 25 of the sealing member 22. The entire assembly is clamped together by the bolts 28. The rim portions 29 and 30 of the sealing members are faced toward each other, and when relaxed as shown in FIG. 2, each rim conforms generally to a truncated cone. Each rim has an outer annular sealing area 32 and 33 which serves to establish sealing contact with the inner cylindrical surface of the sleeve 13. In this embodiment, the clamping members 26 and 27 are provided with annular lips or shroud portions 34 and 35 which afford some support fo the rims 29 and 30, thus somewhat reinforcing the rims with respect to excessive outward deflection.

FIG. 3 and 4 serve to illustrate movement of the plunger from a retracted position outside of the sleeve to a projected position within the sleeve as shown in FIG. 4. When the plunger is outside of the sleeve as shown in dotted lines in FIG. 3, the sealing members are relaxed and have an external diameter which is greater than the internal diameter of the sleeve 13. When the plunger assembly is moved toward the sleeve 13, the sealing member 22 first engages the converging entrant portion 13a of the sleeve, whereby the rim of sealing member 22 is contracted and the sealing area 33 of that sealing member brought into sealing engagement with the inner surface of the sleeve. The solid line showing of the plunger assembly on FIG. 3 represents a position in which the sealing member 22 is contracted with its sealing area 33 in sealing engagement with the inner periphery of the sleeve 13. However, the sealing member 21 remains relaxed. As the plunger assembly moved to the fully closed position shown in FIG. 4, the rim of the sealing member 21 engages the entrant portion at 13a whereby it is likewise contracted and its sealing area 32 brought into sealing engagement with the inner periphery of the sleeve 13. Thus from the open position shown in FIG. 3 to the closed position shown in FIG. 4, the rims of the two sealing members are successively contracted and caused successively to establish sealing engagement with the inner periphery of the sleeve 13 on two axially spaced annular areas. Assuming that space 36 communicating with one end of the sleeve represents the upstream side and space 37 at the other end of the sleeve the downstream side, and that incompressible liquid is being handled, and the plunger assembly is being moved from the space 36 to space 37, during the interval after the sealing member 21 engages the surface of the entrant portion 13a and is being contracted to the internal diameter of the sleeve 13, liquid is trapped in the space 38 between the sealing members with the development of substantial static pressure. For example, with a plunger assembly adapted to operate with a sleeve having an internal diameter of about 8 inches, and with proportions generally according to those illustrated in FIG. 2, the pressure developed in the space 38 upon movement of the plunger assembly into the sleeve is of the order of 100 lbs. per square inch, over and above the static pressure in space 36.

By reference to FIG. 4, it will be seen that the space 38 surrounds the periphery of the separator 23, and is also bounded by the rims of the sealing members and that annular area of the sleeve which extends between the sealing areas 32 and 33. The development of this induced pressure is necessarily accompanied by some stressing of the rims of the sealing members, and the rims are urged outwardly by the trapped fluid pressure to increase the sealing contact pressure between the areas 32 and 33 and the inner peripheral surface of the sleeve. This serves to ensure effective sealing irrespective of some dimensional changes or changes in the elasticity of the sealing members. Also this trapped pressure ensures good sealing engagement under conditions of low line pressure and lower pressure differential between spaces 36 and 37.

It is desirable to make use of the pressure developed in space 38 to indicate any leakage past the plunger assembly. Thus one side of the sleeve 13 is shown provided with a port 39 which communicates between space 38 and pipe 41. This pipe as shown in FIG. 1 can connect with a differential pressure operated electrical switch 42, the contacts of which control the circuits 43 and 44, which are provided with lamps or other indicating means 45 and 46. Switch 42 is of the type having two closed fluid chambers separated by a movable fluid pressure operated member, which controls opening and closing of two sets of contacts for controlling the circuits 43 and 44. One fluid chamber connects with pipe 41, and the other chamber is shown connected to pipe 48 which leads to the upstream side represented by space 36. To provide for instances when the space 37 may be on the upstream side, a second pipe connection 49 can be provided. Lines 41, 48 and 49 are all shown provided with valves, and if desired, they can be provided with pressure gauges as illustrated. Assuming that space 36 represents the upstream side, the valves are operated whereby communication is established between spaces 36 and 38 and the respective fluid chambers of the pressure operated switch 42. In the event space 37 becomes the upstream side, then the valves are manipulated to discontinue communication through line 48 and establish communication through lines 41 and 49 with the chambers of the fluid pressure operated switch 42.

Assuming that space 36 represents the upstream side, and that communication is established through lines 41 and 48 with the chambers of switch 42, then the switch 42 can be set whereby as long as the differential pressure remains in the space 39 at a value ranging from, say, 80 to 100 p.s.i., the lamp 45 will remain illuminated. However, if the pressure should drop below this range due to leakage past the sealing members, then lamp 45 is extinguished and lamp 46 is illuminated.

Under certain conditions the pressure within the space 38 may become excessive, thus causing possible injury to the sealing members or necessitating excessive force to move the plunger assembly. Development of such excessive pressure can be prevented by provided a pressure operated bleed-off valve 51 in communication with pipe 41. This can be set to open when the trapped pressure reaches a value of say 1 ½ times rated working pressure. Thus, if excessive pressure develops in space 38, due for example to a relatively high rise in temperature, some liquid is vented from the space to thereby reduce its pressure to a safe and workable value.

In place of a simple pressure operated relief valve 51 as described above, it is possible to provide relief means which operates to relieve pressure in the space 38 when this pressure exceeds a value over and above the pressure which may be reached in the upstream space 36. Thus a pressure operated relief valve 52 is shown connected to the port 53 in one side of the sleeve 13, and also has a connection by way of pipe 54 with the upstream space 36. It is assumed that the pressure operated member of device 52 is responsive to both pressure applied from the space 38 and pressure from the space 36, whereby it is caused to open when the pressure attained in space 38 exceeds a value of say 100 p.s.i. over and above the pressure that is in the upstream space 36. Thus under such conditions the fluid pressure operated member of relief valve 52 serves to open the valve means of the same, thus venting off some liquid to the space 36 and reducing the trapped pressure.

The embodiment illustrated in FIG. 5 shows an assembly similar to FIG. 2, but in this instance an annular shroud means 56 is carried by the spacer 23, and is interposed between the edge portions 57 and 58 of the sealing member rims 29 and 30. The shroud means 56 provides annular lips 59 and 60 which overlie the edge portions 57 and 58, thereby serving to limit outward flexing of the rim portions. Preferably the spaces on the opposite sides of the shroud 56 are interconnected, as by means of one or more vent openings, whereby pressure in the spaces surrounded by the rim portions are equalized. Supporting the rims of the sealing members in this fashion facilitates operation at substantially higher line pressures and flow rates, without injury to the sealing members.

As previously mentioned, the present invention provides effective sealing on spaced annular areas with trapped pressure serving to increase the contact pressure between the rims of the sealing members and the inner surface of the cylindrical sleeve, thus promoting effective sealing under all conditions of operation, including low line pressure and pressure differential between the upstream and downstream sides of the apparatus. In addition effective leak detection is provided.

The value of the differential pressure developed in space 38 is dependent upon certain factors, including the volume of space 38 when the plunger assembly is within the sleeve 13 as in FIG. 4, and the volume of this space when sealing area 32 first engages the tapered entrant portion 13a, assuming that the assembly is moving from the position of FIG. 3 to that of FIG. 4. As this difference in volume is increased, as by increasing the relaxed diamter of member 21, the final differential pressure developed is likewise increased.

I claim:

1. In a fluid flow control apparatus, a sleeve having an inner cylindrical surface and a converging entrant portion at at least one end of the same, means forming liquid enclosing spaces communicating with the ends of the sleeve, a plunger assembly, means serving to carry the plunger assembly for movement axially of the sleeve between positions within and retracted out of the sleeve, and sealing means carried by the plunger assembly and serving to establish a seal between said spaces when the plunger is within the sleeve, the sealing means comprising two cup-shaped seaing members of resilient material, each member having a base portion and an annular rim portion, the outer periphery of the rim portion having an annular sealing area located intermediate the base portion and the free edge of the rim portion, the rim portion when relaxed being of a diameter greater than the inner diameter of the sleeve and being contracted with radial flexing of the rim when moved to a position within the sleeve with said area in sealing engagement with the inner sleeve surface, said cup-shaped sealing members being spaced along the axis of the plunger and having the free edges of their rim portions faced toward each other, and means for mounting the sealing members, said means forming a closed annular space surrounded by the rims of the sealing members, successive contraction and radial flexing of the rim portions as the plunger is moved into the sleeve serving to trap liquid thereon under pressure greater than the static pressure in the space from which the plunger is moved, said pressure serving to urge the rim portions in an outward radial direction to press said sealing means against the inner sleeve surface.

2. Fluid control apparatus as in claim 1 in which means is provided in communication with said closed space for detecting a change in the pressure of the trapped liquid.

3. Apparatus as in claim 1 in which shroud means is provided for limiting outward deflection of the rim portions during movement into and out of the sleeve.

4. Apparatus as in claim 3 in which the shroud means is interposed between the free edges of the rims and has annular lip portions overlying the edge portions of the rims.

5. Apparatus as in claim 1 together with means for venting liquid from the closed space under conditions of excessive pressure.

6. Apparatus as in claim 5 in which said venting means serves to vent liquid from the closed space when the pressure therein attains a value more than a predetermined amount over and above the line pressure.

7. In a flow control and leak detection method making use of control apparatus including a sleeve having an inner cylindrical surface and a converging entrant portion at at least one end of the sleeve and a body forming liquid enclosing spaces communicating with the ends of the sleeve, the apparatus also including a plunger assembly and means for carrying the plunger assembly for movement axially of the sleeve between a closed position within and an open position retracted from the sleeve, the plunger having means for establishing a seal between the body spaces when the plunger is within the sleeve, the sealing means comprising two cup-shaped members of resilient material, each member having an annular rim portion with an outer annular sealing area spaced from the free edge of the rim, the rim portion of each sealing member when relaxed being of a diameter greater than the inner diameter of the sleeve, the cup-shaped sealing members being spaced along the axis of the plunger and having their rim portions faced toward each other, the arrangement being such that when the assembly is within the sleeve there is a closed annular space embraced by the rims; the method comprising moving the plunger assembly from the open retracted position to the closed position within the sleeve, causing the sealing areas of the rim portions successively to establish sealing engagement with the inner surface of the sleeve and to be successively radially contracted, the last one of the sealing members to progress into the sleeve serving as it contracted to increase the pressure in the closed space embraced by the rims of the sealing members, the increased pressure serving to press the sealing areas of the rims against the inner surface of the sleeve, and securing an indication of the pressure in said space to detect leakage.

8. A method as in claim 7 in which the last step is responsive to the difference between the pressure in the closed space and the pressure in the body space from which the plunger assembly is moved.

9. A method as in claim 8 in which the pressure in the closed space is relieved when it exceeds a predetermined value.

* * * * *